United States Patent [19]

Wilkes

[11] Patent Number: 4,609,696

[45] Date of Patent: Sep. 2, 1986

[54] RUBBERIZED ASPHALT EMULSION

[75] Inventor: Elizabeth Wilkes, Glendale, Ariz.

[73] Assignee: Union Oil Company of California, Los Angeles, Calif.

[21] Appl. No.: 738,106

[22] Filed: May 24, 1985

[51] Int. Cl.⁴ ............................................. C08L 95/00
[52] U.S. Cl. ....................................... 524/59; 524/62; 524/67; 524/68; 524/71; 524/474
[58] Field of Search ........................ 524/59, 62, 67, 68, 524/71, 474

[56] References Cited

U.S. PATENT DOCUMENTS

| | | | |
|---|---|---|---|
| 3,337,987 | 8/1967 | Bennett | 524/59 |
| 3,635,863 | 1/1972 | Drukker | 524/59 |
| 4,069,182 | 1/1978 | McDonald | 524/59 |

*Primary Examiner*—Melvyn I. Marquis
*Attorney, Agent, or Firm*—Dean Sandford; Gregory F. Wirzbicki; Robert J. Baran

[57] ABSTRACT

This invention provides emulsions of rubberized asphalt, which are preferably extended with oil and are especially useful for chip seal, slurry seal and cold mix applications. The novel composition may be prepared by passing an aqueous surfactant-containing solution and a homogeneous gel, comprising rubberized asphalt or oil-extended rubberized asphalt through a colloid mill to provide an emulsion having a small and uniform particle size.

23 Claims, No Drawings

RUBBERIZED ASPHALT EMULSION

FIELD OF THE INVENTION

This invention relates to rubberized-asphalt emulsions and oil extended, rubberized-asphalt emulsions useful for highway construction and pavement maintenance.

BACKGROUND OF THE ART

Asphalt, a useful material for paving and resurfacing roadways, may be modified by incorporation of rubber therein. See U.S. Pat. Nos. 3,891,585 and 4,069,182. Asphalt-rubber compositions are believed to be an improvement over asphalt alone, due to the increased flexibility, adhesivity, etc. However, due to the high viscosity, rubberized asphalt is difficult to apply by spraying. Therefore, it is known to heat asphalt and rubber blends to lower the viscosity and facilitate application. Heating requires special equipment and experienced personnel. Obviously, it is desirable to avoid working with a hot material at a job site; thus, asphalt and rubber blends have been modified by incorporation of various solvents therein to decrease the viscosity. For example, in U.S. Pat. No. 3,919,148, kerosene is taught as a useful solvent to decrease the viscosity of an asphalt-rubber blend. It is found that the volatility of kerosene caused a problem at the temperature at which the blend was applied. That is, if the kerosene-modified blend stood for too long, prior to application, the viscosity increased almost to the viscosity of a kerosene-free asphalt-rubber blend. Thus, less volatile oils may be used in place of the kerosene to lower the viscosity of the asphalt rubber blend. See U.S. Pat. Nos. 2,728,734, 4,021,393 and 4,068,023.

Another approach to providing a blend of asphalt and rubber in an easy applicable form may be found in a product comprising an emulsion of asphalt and rubber in water. Certain asphalt and rubber emulsions are pourable and sprayable at ambient conditions. Thus, the emulsion may be applied at the site, and as the emulsion breaks, the asphalt and rubber deposited therefrom is available as a paving material. Chip sealing applications using asphalt and rubber emulsions are now prevalent. Asphalt and rubber, however, are not easy to form into a stable emulsion. In U.S. Pat. No. 4,018,730 an asphalt pavement material is disclosed which is emulsified by a soap consisting essentially of water, an anionic water soluble emulsifying agent, a thickener and a halide of an alkali metal or an alkaline earth metal. Moreover, in the above-mentioned U.S. Pat. No. 4,021,393, it is disclosed that a asphalt-rubber-malthene paving composition may be emulsified using the emulsion system of U.S. Pat. No. 4,018,730. Other examples of emulsified blends of asphalt and rubber may be found in U.S. Pat. Nos. 3,785,852, 2,978,427, 3,565,842, 2,714,582 and 3,493,408. However, in many of the above references, the asphalt-rubber blend is prepared by mixing an asphalt emulsion and a rubber latex. Of course, in such emulsions as these, the asphalt and the rubber particles will exist separately, and thus a true rubberized asphalt is not obtained in either the emulsion state or upon application. See, in particular, U.S. Pat. Nos. 3,785,852 and 3,493,408.

In view of the obvious safety advantages, in working with water-continuous paving compositions, the advantages of asphalt-rubber emulsions are apparent. In view of this there is an on-going effort to continue to develop water-based asphalt and rubber emulsions which are stable and easily applied.

SUMMARY OF THE INVENTION

This invention provides emulsions of rubberized asphalt, which are preferably extended with oil and are especially useful for chip seal, slurry seal and cold mixed applications. The novel oil-extended compositions may be prepared by combining a hydrocarbon oil having a flash point of 300° F., or more, with asphalt to provide a homogenous asphalt-oil mixture. This homogenous mixture or solution may then be combined with a finely ground particulate rubber, for example a reclaimed tire rubber, and heated to form a homogeneous gel comprising asphalt, rubber and oil. The gel is then emulsified in an aqueous solution comprising water and an emulsifying agent selected from the group consisting of cationic, anionic or amphoteric surfactants to provide a stable emulsion. The emulsification of either an asphalt-rubber gel or an oil-extended asphalt rubber gel may be effectively carried by passing an aqueous surfactant-containing solution and the homogeneous gel through a colloid mill to provide an emulsion having a small and uniform particle size. Furthermore, to achieve homogeneity the particularized rubber comprises −20, mesh or more preferably −50 mesh material.

DETAILED DESCRIPTION OF THE INVENTION

Asphalts which may be utilized herein include any of the well known bituminous materials used heretofore in the paving art such as natural asphalts or those derived from petroleum refining, for example by vacuum distillation, solvent refining, steam refining with or without air blowing, and the like.

For the purposes of this invention the asphalt may be selected according to the asphalt cement specifications or AC specifications. In this specification, the absolute viscosity at 140° F. determines the AC number. Thus, an asphalt designated as AC 2.5 has a viscosity of 250 poise, and an asphalt designated as AC 10 has a viscosity of 1,000 poise and so forth. In general asphalts ranging from AC 2.5 to AC 40 may be used in this invention.

Those skilled in the art will readily understand that the selection of a suitable grade of asphalt depends primarily on the climatic conditions to which the material is to be subjected. The softer grades of asphalt are most often chosen for cold weather, while harder grades are preferred for extremely warm weather.

The rubber component used herein may be either natural rubber or synthetic rubber. Preferably, for economy, the rubber component employed herein is either natural reclaimed rubber or synthetic reclaimed rubber. The synthetic rubbers are preferably polymers of open-chain conjugated dienes having from 4 to 8 carbon atoms per molecule, for example 1,3-butadiene, 2,3 dimethyl-1,3-butadiene, and the like. Examples of such polymers are polybutadiene, polyisoprene, polychloroprene, butadiene-styrene copolymers and the like. Copolymers of mixtures of such conjugated dienes can also be used, as well as copolymers of monomer systems having a major amount of conjugated diene with a minor amount of copolymerizable monomer containing a vinylidene group.

It is much preferred to utilize ground reclaimed, vulcanized natural rubber, and ground devulcanized natural reclaimed rubber. To obtain optimum combinations of desirable physical characteristics, the concentration of ground rubber should be within the range of from about 1 to 20 percent, more preferably from 1 to 10 percent, e.g. about 2 to 5 percent, by weight of the combined asphalt and rubber or asphalt, rubber and oil.

In order to obtain the desired emulsion properties, the rubber should be ground to pass at least 90 percent thereof, by weight, through 20 mesh (U.S. Standard Sieve Size.)

Preferably the rubber will comprise 100 percent−20 mesh material, more preferably 100 percent−50 mesh material.

In the preferred oil-extended products of this invention, the mineral oil solvents of choice are heavy aromatic fractions of petroleum, coal tar, tar sand oils, shale oils and the like, boiling generally in the range of about 700°–1100° F., and having a gravity ranging between about 3° and 12° API. The aromatic content of these oils generally ranges between about 50 and 100 percent, preferably between about 60 percent and 95 percent by weight (clay-gel method). The content of saturated hydrocarbons is preferably less than about 20 weight percent, preferably less than 12 weight percent. Polar compounds, such as heterocylic nitrogen and sulfur compounds, may range between about 5 and 25 weight percent. The flash point, c.o.c., of the oil is preferably above about 300° F., more preferably above about 350° F. Oils of this character are generally derived from the solvent extraction of distillate or residual lubricating oil stocks, using solvents such as phenols, cresols, furfural and the like. They may or may not contain asphaltenes, depending upon whether a distillate or residual feedstock is extracted. Heavy recycle oils derived from catalytic cracking operations, sometimes called "slurry" oils, can also be utilized.

Examples of suitable solvent oils are those marketed by Shell Chemical Company under the trade name "Dutrex," those marketed by Sun Oil Company under the trade name "Sundex" and those marketed by Witco Chemical Company under the trade names "Petroflux" and "Califlux." Particularly suitable oils are the following:

TABLE I

|  | Dutrex 419 | Dutrex 739 | Dutrex 916 | Dutrex 957 |
|---|---|---|---|---|
| Gravity, °API | 8.8 | 5.6 | 9.4 | 5.6 |
| Flash Point, °F. | 365 | 425 | 430 | 510 |
| Distillation, °F. | | | | |
| IBP | 622 | 740 | 700 | 775 |
| 50% | 736 | 818 | 917 | 930 |
| 90% | 840 | 884 | Crk. | Crk. |
| Viscosity-Gravity Constant | 0.986 | 1.004 | — | 0.980 |
| Molecular Analysis (Clay-Gel W %) | | | | |
| Asphaltenes | 0 | 0 | 3.9 | 0 |
| Polar Compounds | 15.4 | 18.0 | 22.1 | 26.8 |
| Aromatics | 76.0 | 76.0 | 57.6 | 66.2 |
| Saturates | 8.6 | 6.0 | 16.4 | 7.0 |

The method used for compounding the components of the asphalt-rubber or asphalt-rubber-oil gel is relatively simple. The only requirement is to provide suitable means for agitating and heating the resulting mixture to from 300° F. to 400° F., for a time sufficient to provide a homogenous gel.

Generally mechanical means for agitating is provided, such as propellers, augers, paddles or the like. All the components of the gel may be added at the same time; however, to achieve thorough homogeneity, the extruder oil (when included) is added to the asphalt prior to the addition of rubber. The time required to achieve homogeneity and digestion of the natural rubber generally ranges from about 0.5 to about 3 hours, at a temperature from 350° to 400° F., assuming there is good agitation. Proportions of the components of the gel are preferably in the following ranges.

TABLE II

| | Weight Percent Range | |
|---|---|---|
| Component | Preferred | Most Preferred |
| Asphalt | 80–98 | 90–95 |
| Extender Oil | 1–15 | 2–5 |
| Rubber | 1–10 | 2–5 |

The selection of specific proportions of the three components will depend upon several factors. The desired characteristics of the finished emulsion, the intended application of the emulsion, and the optimum tolerances in the emulsification process.

The gel is then emulsified in water to provide the final product. During the emulsification process, the temmperature of the gel and the solution must be monitored to assure that the discharge temperature of the finished emulsion is below the boiling point of water (212° F.). Average temperatures of the gel and aqueous solution are 280° F. and 90° F. respectively. The kinematic viscosity at 275° F. on the gel is a good indicator in determining if the temperature of the gel requires additional heating for emulsification purposes. When a higher temperature is needed to bring the viscosity of the gel down, the aqueous solution temperature should be lowered. In no case should the temperature of the gel exceed 300° F. during the emulsion process.

To provide a stable emulsion, emulsification takes place in a colloid mill wherein the aqueous solution and the gel is passed through the clearance between a rotor and a stator. Said clearance is on the order of a few micrometers and therefore with such a small clearance an extreme shearing action occurs. The emulsion exiting the colloid mill has a uniform particle size due to the fixed clearance between the rotor and stator. Furthermore, owing to the tremendous shearing forces applied to the emulsion, a significant temperature rise occurs during emulsification and thereby maintains the viscosity of the gel as well as the viscosity of the emulsion at a fairly low level. The use of a colloid mill has been unexpectedly found to provide stable emulsions of oil extended rubberized asphalt, without the use of thickeners.

To stabilize the emulsion, an emulsifying agent is provided in aqueous solution. The emulsifying agent is selected from the group consisting of anionic, cationic or amphoteric surfactants.

The types of surfactants useful in this invention include fatty amines (diamines, amidoamines, imidazolines, quaternary amines etc.) to provide cationic emulsions. Fatty acids (tall oil, resins, lignins, etc.) may be used to provide anionic emulsions. Hydrochloric acid or caustic soda is added in the cationic and in the anionic emulsions, respectively, to maintain an ionic charge on the surfactant. The amphoteric surfactants, which may have either a positive or negative charge, according to the pH of the emulsion, are illustrated by the sulfobetaines.

In general, the emulsion will comprise from about 30 to about 50, more preferably from about 30 to about 40 percent, by weight, water. The surfactant may vary from 0.2 to about 2, more preferably from about 0.5 to about 1.5 percent, by weight, of the emulsion. Other well known additives to improve the stability of the emulsion such as thickeners, etc. are not usually necessary but may be added if desired.

The invention is further illustrated by the following example which is illustrative of a specific mode of practicing the invention and is not intended as limiting the scope of the appended claims.

EXAMPLE

For purposes of this invention AC-20 asphalt from California is modified with 2% rubber extender oil, and then 3% ground natural rubber (−20 mesh) is reacted therewith at 400° F. for 2 hours. The following test results from the reacted compound are compared with the same paving grade AC-20 without the oil or rubber; see Table III below.

TABLE III

|  | AC-20 | AC-20 Asphalt-Rubber-Oil |
|---|---|---|
| Original: |  |  |
| Viscosity, 140° F. ps | 2060 | 2906 |
| Viscosity, 275° F. cst | 350 | 413 |
| Penetration, 77° F. | 68 | 85 |
| Ductility, 39.2° F. cm | '13 | 16.75 |
| Flash point, C.O.C.° F. | 470 | 490 |
| Residue from RTFO: |  |  |
| Viscosity, 140° F., ps | 7410 | 7740 |
| Ductility, 77° F., cm | 100+ | 32.5 |

The AC-20 Asphalt-Rubber-Oil gel is emulsified to provide an emulsion comprising about 40 percent water by passing the gel through a colloid mill, with a sufficient amount of an aqueous solution comprising a surfactant, at a temperature of about 90° F. The following emulsions are obtained:

| (CRS) Cationic Rapid Set | |
|---|---|
| 0.9% | Tallow Diamine |
| 0.8% | HCl |
| 30.3% | H₂O |
| 68.0% | Asphalt-Rubber-Oil Gel |
| (CSS) Cationic Slow Set | |
| 1.3% | Quaternary Amine |
| 0.9% | HCl |
| 35.8% | H₂O |
| 62.0% | Asphalt-Rubber-Oil Gel |
| (RS) Rapid Set | |
| 0.9% | Tall Oil |
| 0.7% | NaOH |
| 30.4% | H₂O |
| 68.0% | Asphalt-Rubber-Oil Gel |
| (SS) Slow Set | |
| 1.3% | Fatty Acid |
| 0.7% | NaOH |
| 36% | H₂O |
| 62% | Asphalt Rubber Base Stock |

The difference in setting rate is due to concentration as well as the surfactant selected.

It will be appreciated, by those skilled in the art, that the amount of surfactant needed to stabilize the asphalt-rubber-oil emulsion will vary depending on the particular asphalt and the type of surfactant used.

While particular embodiments of the invention have been described, it will be understood, of course, that the invention is not limited thereto since many obvious modifications can be made, and it is intended to include within this invention any such modification as will fall within the scope of the appended claims.

What is claimed is:

1. A method of making a rubberized asphalt composition which comprises the steps of:
   (a) combining asphalt with a hydrocarbon oil having a flash point of 300° F. or more to provide a homogenous asphalt-oil mixture or solution,
   (b) then combining said asphalt-oil mixture with a particulate rubber at a temperature sufficient to provide a homogenous asphalt-rubber-oil gel, and
   (c) emulsifying said asphalt-rubber-oil gel by passing said gel, water, and an emulsifying agent through a colloid mill to provide an emulsion.

2. The method of claim 1 wherein said particulate rubber comprises a hydrocarbon rubber.

3. The method of claim 2 wherein said hydrocarbon rubber is reclaimed tire rubber.

4. The method of claim 3 wherein said reclaimed tire rubber consists essentially of −20 mesh material.

5. The method of claim 2 wherein said hydrocarbon oil is a heavy fraction of petroleum, coal tar, tar sand oils or shale oils boiling in the range of about 700° to 1100° F. and having a gravity ranging between 3° and 12° API.

6. The method of claim 2 wherein said asphalt has an absolute viscosity at 140° F. of from about 250 to 4,000 poise.

7. The method of claim 2 wherein the emulsifying agent comprises a surfactant selected from the group consisting of anionic, cationic and amphoteric surfactants.

8. The method of claim 2 wherein said emulsion comprises from about 30 to about 40 percent water, by weight.

9. The method of claim 2 wherein said asphalt-rubber-oil gel comprises from about 1 to about 10 percent rubber and from about 1 to about 15 percent oil, by weight.

10. The method of claim 7 wherein said surfactant comprises from about 0.5 to about 1.5 percent, by weight, of said emulsion.

11. A method of making a rubberized asphalt composition which comprises the steps of:
   (a) combining a particulate rubber comprising reclaimed tire rubber with asphalt at a temperature sufficient to provide a homogenous asphalt-rubber gel, and
   (b) emulsifying said asphalt-rubber gel by passing said gel, water, and an emulsifying agent through a colloid mill to provide an emulsion.

12. The method of claim 11 wherein said reclaimed tire rubber consists essentially of −20 mesh material.

13. The method of claim 11 wherein said asphalt has an absolute viscosity at 140° F. of from about 250 to 4,000 poise.

14. The method of claim 11 wherein the emulsifying agent comprises a surfactant selected from the group consisting of anionic, cationic and amphoteric surfactants.

15. The method of claim 11 wherein said emulsion comprises from about 30 to about 40 percent water, by weight.

16. The method of claim 14 wherein said surfactant comprises from about 0.5 to about 1.5 percent, by weight, of said emulsion.

17. The rubberized asphalt emulsion product of claim 1.

18. The rubberized asphalt emulsion product of claim 11.

19. The rubberized asphalt emulsion product of claim 9.

20. A rubberized asphalt emulsion composition consisting essentially of a gel, containing asphalt, rubber, and a hydrocarbon oil having a flash point of 300° F. or more, emulsified in a surfactant-containing aqueous solution.

21. The composition of claim 20 wherein said gel comprises from about 1 to about 10 percent rubber and from about 1 to about 15 percent oil, by weight.

22. The composition of claim 21 wherein said composition comprises from about 30 to about 40 percent water, by weight.

23. The composition of claim 22 wherein said composition comprises from about 0.5 to about 1.5 percent, by weight, surfactant.

* * * * *